United States Patent [19]
Yang et al.

[11] Patent Number: 5,210,316
[45] Date of Patent: May 11, 1993

[54] DYE AND METHOD FOR MAKING SAME

[75] Inventors: Luoqing Yang, Placentia, Calif.; Ron Buescher, Fayetteville, Ark.

[73] Assignee: University of Arkansas, Little Rock, Ark.

[21] Appl. No.: 650,230

[22] Filed: Feb. 4, 1991

[51] Int. Cl.$^5$ .............................................. C07C 45/00
[52] U.S. Cl. ...................................... 568/404; 562/19; 8/584; 8/607; 426/540
[58] Field of Search ................. 568/414, 319, 404; 566/175; 556/175; 562/8, 9, 11, 19; 8/527, 541, 584, 607; 426/540; 51/111, 125

[56] References Cited
U.S. PATENT DOCUMENTS
4,263,333  4/1981  Maing et al. ........................ 556/175

OTHER PUBLICATIONS
Leshek, Chemical Abstracts, vol. 96, #5, 1981, 33619u.

Primary Examiner—José G. Dees
Assistant Examiner—D. D. Carr
Attorney, Agent, or Firm—Hermann Ivester

[57] ABSTRACT

The present invention provides a modified turmeric. The modified turmeric is a phosphorylated turmeric that results in a structure having greatly improved stability in the presence of light, and solubility in the presence of a solution. The invention produces a natural dye for use as a substitute for yellow dye No. 5.

20 Claims, 1 Drawing Sheet

DYE AND METHOD FOR MAKING SAME

BACKGROUND OF THE INVENTION

The present invention relates generally to dyes and methods of making same. More specifically the present invention relates to turmerics, a natural yellow pigment composed of curcumin and related curcuminoids isolated from Curcuma longa rhizomes.

Presently, the yellow pigments, turmeric and tartrazine, are approved by the FDA for use in foods and beverages. Tartrazine (FD&C yellow No. 5) is a stable, water soluble synthetic dye. Turmeric, on the other hand, is water insoluble and relatively unstable. However, turmeric is a natural rather than a synthetic dye. Recently many companies have been searching for a substitute to FD&C yellow No. 5.

Turmeric is a natural yellow pigment isolated from Curcuma longa rhizomes. Currently, turmeric is used in foods, cosmetics and pharmaceuticals. In its present commercial form, turmeric is not water soluble and its color fades when exposed to light, heat, and oxidants. Thus, it is not an acceptable dye for use in many foods in its present form.

Previously attempts have been made to improve the stability and/or water solubility of curcumin, the major component of turmeric. For example, a soap solution has been used to extract turmeric roots and obtain a water soluble turmeric. Additionally, it has been proposed to dissolve defatted oleoresin turmeric in 75% acetic acid prior to mixing the solution with gelatin, resulting in a water soluble turmeric bound to gelatin. However, these efforts fail to provide a turmeric that is both stable and water soluble.

It has additionally been proposed to mix turmeric oleoresin with modified wax starch, citric acid, sodium citrate and water, and then spray dry the mixture. It was reported that the resulting dry concentrate maintained its stability after sixteen and one half weeks of storage in dark, having good color, at 35.C in sealed polymer film. However, improved stability of curcumin in aqueous solutions such as pickle brines or other food products was not reported.

It has also been reported to attempt to modify curcumin by acetylation with acetic anhydride. The resulting characteristics of this product have not been reported.

SUMMARY OF THE INVENTION

This invention provides an improved dye comprising a modified turmeric. The resultant product has substantially improved color stability and water solubility. The necessary agents for the chemical modification and subsequent purification of turmerics are simple and inexpensive. Accordingly, the present invention provides a product that can be economically manufactured and commercialized.

To this end, the present invention provides a phosphorylated turmeric. The present invention also provides methods of making the modified turmeric. The resulting derivatives of turmeric have improved water soluble and stable characteristics.

In an embodiment the method for making the dye comprises the step of: dissolving a turmeric (curcumin and curcuminoids) in a component to create a mixture; maintaining the mixture at a predetermined pH range; and adding a phosphorylating agent to the mixture to create a modified turmeric.

The invention can be used to color feeds, foods, beverages, cosmetics, and pharmaceuticals. To this end, the present invention provides a yellow coloring similar to turmeric or tartrazine. It may be realized after appropriate testing that the modified turmeric is also an anti-oxidant and/or provides certain medical benefits, such as hindering inflammation and arthritis which have been purported from the use of the parent turmeric. Also, the modified turmeric may serve as an effective dye for textiles, hair, or other non-food materials.

An advantage of the present invention is that it provides a new, useful, and unique product that should have a high market demand. Several food companies desire to eliminate FD&C yellow No. 5 from all of their food products since a portion of the population is adversely sensitive to tartrazine. To date, turmeric is the only other FDA approved yellow dye which has color characteristics closely similar to FD&C yellow No. 5. Thus, a modified turmeric, constructed in accordance with the principles of the present invention, that is an effective and stable coloring agent, could readily substitute for the synthetic dye FD&C yellow No. 5.

DETAILED DESCRIPTION OF THE PRESENTLY PREFERRED EMBODIMENTS

Figure 1:
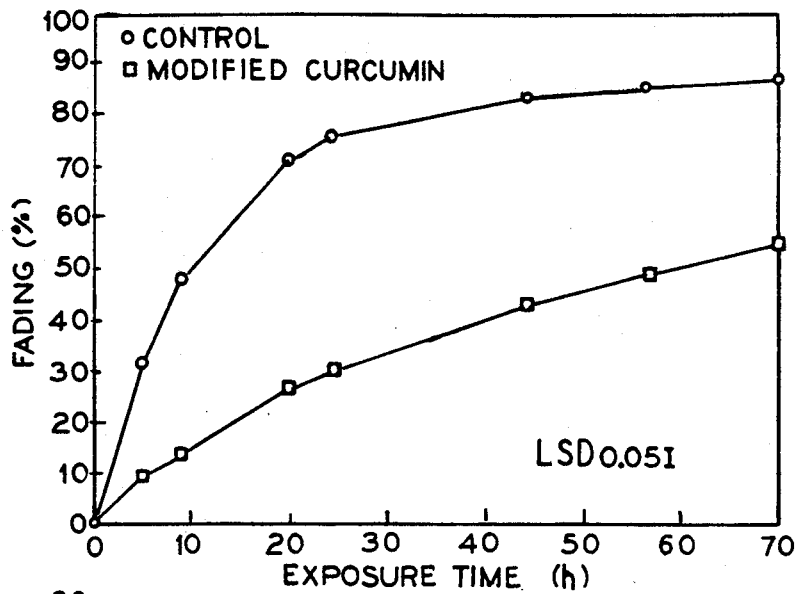
FIG. 1 illustrates, graphically, light induced fading of modified and unmodified curcumin in pickle brine.

The present invention provides a dye comprising a modified turmeric that results in an improved product. To this end, the resulting turmeric has substantially improved color stability and water solubility over known turmerics. The natural dye resulting from the modified turmeric results in a dye for use in foods, beverages, cosmetics, and pharmaceuticals.

To this end, the present invention provides a phosphorylated turmeric. The phosphorylated turmeric can be used as a dye and specifically as a substitute to synthetic Yellow dye No. 5.

Generally, the method of making the dye comprises the step of phosphorylating a turmeric. In an embodiment the turmeric is phosphorylated with $POCl_3$.

In an embodiment of the method of the present invention, turmeric powder or extracted curcumins are dissolved in a solution. The pH of the mixture is maintained within a predetermined range and a phosphorylating agent is added to the resultant mixture. If necessary, or desired, the mixture can be neutralized, concentrated or purified. The resultant product can then be used as a dye.

For example, the modified turmeric dye can be used in food stuffs, e.g., for coloring a pickle, soup broth or beverage. Likewise, the dye can be used in cosmetics, for example for eye shadow. Additionally, the dye can be used in pharmaceuticals to provide distinctiveness to a pharmaceutical, for example a Valium ® tablet.

By way of example and not limitation, an example of a method for making the modified turmeric is as follows:

Turmeric powder or extracted curcumin is dissolved in a sodium or potassium hydroxide solution, for example 0.1N NaOH (1g/10ml).

The mixture is placed in a reaction vessel, kept cold in an ice bath, and stirred to adjust the pH to approximately 12 to 13 with NaOH.

The vessel is then flushed with nitrogen.

Phosphoryl chloride ($POCl_3$) is slowly added while maintaining the pH at approximately 12 to about 13. One gram of curcumin is sufficiently modified by 1.5 ml of $POCl_3$ to improve stability and solubility in $H_2O$. With increasing amount of $POCl_3$ per gram of curcumin, solubility in water increases; however, stability is not further improved.

After the addition of $POCl_3$ is completed and no further addition of NaOH is required to maintain the pH at approximately 12 to about 13. The solution is neutralized with an organic or mineral acid.

The resultant solution may be used directly for the pigmentation of food, cosmetics or other materials. Additionally, the resultant solution may be dried or purified by desalting for later use.

By way of example and not limitation, examples of the invention will now be given.

The following materials were used in the examples. Phosphorus oxychloride ($POCl_3$), 97%, was purchased from Aldrich Chemical Company. Curcumin, n-propanol, guar gum, and syloid purchased from Sigma Company were used. Turmeric was used from Kalsec Company. Hydrochloric acid, sulfuric acid, and sodium metabisulfite, sodium sulfite, sodium hydroxide, lactose, ammonium molybdate and hydrogen peroxide were used from Fisher Scientific Inc. 1-amino-2-naphthol-4-sulfonic acid from Eastman Kodak Company was used.

The following procedure was used to achieve esterification. A 200ml flask was fitted with a magnetic stirring bar, a pH electrode, and a nitrogen inlet tube connected with a porous gas diffusing end. Curcumin (2.3g, 6.25mmol) was mixed with 20ml precooled (0° C.) deionized water. The water had been purged with nitrogen for 30 min to remove oxygen. The beaker was set in an ice-salt bath to maintain the temperature at about 0° C. A few drops of concentrated sodium hydroxide (about 10N) were added to the solution, while the solution was stirred to adjust the pH to about 13 and to solubilize the curcumin. $POCl_3$ (10 ml) was slowly added to the solution (3 drops/min). The pH was monitored and concentrated NaOH was added, if necessary, to keep the pH around 13. After adding the $POCl_3$, the reaction mixture was held for 15 min, and then it was acidified by slowly adding 6N HCl. Precipitation was initiated at about pH 6. The precipitate was collected on a filter, exhaustively washed with dilute HCl and dried.

An assay of phosphorus was performed. To this end, the modified curcumin (0.1 g) was dissolved in 500 ml water and 1 ml was digested and analyzed for phosphorus using Bartlett's method. Unmodified curcumin, dissolved in acetone (0.1g per 500ml), was used as a control.

Briefly, the procedure was as follows: to achieve digestion, a Pyrex brand long-neck round bottom Kjeldahl flask (100ml), 0.5 ml concentrated sulfuric acid and 1 ml deionized water were mixed with 1 ml sample. The mixture was heated (200 watts at a high setting) in a Labconco 60300 Kjeldahl unit for 7 to 8 minutes. After cooling the solution for 1 minute, additional drops of $H_2O_2$ (30%) were added and the mixture was reheated for 2 minutes and then cooled. After cooling for 1 minute, additional drops of $H_2O_2$ were added and the mixture was reheated for 5 minutes and then cooled.

The assay was as follows. After cooling, 0.7 ml deionized water, 0.2 ml Fiske-Subbarow reagent containing 15% sodium metabisulfite, 0.125% 1-amino-2-naphthol-4-sulfonic acid, 0.24% sodium sulfite, and 1.5ml ammonium molybdate were added to the solution produced from the digestion procedure. The solution was heated in a water bath for 7 minutes. After cooling, the absorbance of the solution was measured at 750 nm. The concentration of phosphorous was calculated from a standard curve. Three replications were used.

Curcumin is particularly unstable during heating. To determine improvements achieved by the phosphorylation of the present invention vis-a-vis heat stability, the following experiment was performed.

Modified curcumin was dissolved in a pickle brine containing 0.1M acetic acid, 0.43M NaCl at pH 3.5, to provide an initial absorbance at 420nm of 0.69. Unmodified curcumin (the control) was mixed with 0.2g Tween 80 and then suspended in 1 Liter of the same pickle brine. The initial absorbance at 420nm was adjusted to 0.71 by adding a pickle brine with the same pH and containing the same amount of acetic acid, NaCl, and 0.02% Tween 80. Six replications were used for each treatment and the samples were heated at 86° in a water bath. The results of the experiment are set forth hereinafter.

To determine the light stability of the phosphorylated curcumin the following experiment was conducted:

Modified curcumin (0.02g) was dissolved in 1 Liter of pickle brine containing 0.1M acetic acid, 0.43M NaCl, 0.1% benzoate at pH 3.5. The control turmeric oleoresin (0.1 g) was dispersed in 1 Liter of the pickle brine (8.5 ppm curcumin ). Solutions of each treatment (5 ml) were added to 1.2×10 cm test tubes. After the tubes were sealed, the tubes were exposed to fluorescent light. A Sequoia-Turner spectrophotometer (Model 340) was used to periodically measure the absorbance at 420nm. The results are set forth hereinafter.

The stability of the modified curcumin in a pickle product was also examined. A pasteurized product which was heated during processing and exposed to light after processing was used for this test. The effect of spice emulsion on the stabilities of the modified curcumin in the pickle product was also examined. All the brines contained 0.1M acetic acid and 0.43M NaCl at pH 3.5.

The following treatments were employed:

Treatment 1 (control) contained 0.11g/l turmeric oleoresin (9.35ppm curcumin); Treatment 2 contained 0.027g/l dried modified curcumin; Treatment 3 contained the same amount of turmeric as Treatment 1 plus commercial spice emulsion (garlic emulsion 0.17 g/l, onion emulsion 0.02g/l); and Treatment 4 contained the same amount of the modified curcumin as in Treatment 2 plus commercial spice emulsion with the same amount as in Treatment 3.

Cucumbers were cut into spears, packed into 24 oz glass jars, and covered with the treatment brines providing a pack-out of 60% pickles and 40% brine (v/v). After sealing, the jars were pasteurized at 75° C. and were held for 5 minutes and cooled.

The stability of modified curcumin was examined after testing with respect to light exposure. Samples were stored in the dark for 2 days, and then three jars of each treatment were exposed to light (7,000 lux) for 4 days at 24° C. The color ( CDM 'L', 'a' and 'b' value) of the mesocarp of 10 spears from each treatment was measured by a Gardner XL 20 color difference meter. The standard plate was white number 1 with L, a and b values of 93.5, −1.4 and 3.2, respectively.

The stability of modified and unmodified curcumin was examined in yogurt. Forty grams of Dannon plain yogurt was mixed with 1 g of deionized water which contained 4.5 mg modified curcumin or 20 mg of Kalsec turmeric oleoresin. The visual color and CDM values of each treatment were similar. Samples (10 g) of each treatment were uniformly distributed in 100×15mm plastic petri dishes. Four replications were used for each treatment. The covered samples were exposed to fluorescent light (14,250 lux) at 8° C. The CDM 'L', 'a' and 'b' values were determined periodically.

Yellow color retention of tablets pigmented with normal or modified curcumin was examined in response to exposure to sunlight. Unmodified curcumin (0.4g) or modified curcumin (0.4g) was dissolved in 12 ml of 50% n-propanol and blended with a mixture of guar gum (3 g), syloid (7 g) and lactose (36 g). The powder mixtures were compressed into cylindrical tablets, 4 g each. The tablets from both treatments were exposed to mid-day sunlight, 28° C. The initial yellow color (CDM 'b' value) was measured, and changes in surface color were monitored at 5 minute intervals by a Minolta CR-200 colorimeter standardized with a white plate.

The resulting data was analyzed by SAS. LSD was used for mean separation (LSD 0.05). The results are set forth hereinafter.

The phosphorus content of the modified curcumin was found to be 6.95%. The calculated phosphorus content for one phosphate group ($-PO_3H_2$) in each curcumin molecule was 6.91%. Thus, the phosphorus content indicated that each modified curcumin molecule had an average of one phosphate group.

The reaction mechanism is not clear, and it is difficult to predict where the phosphate was attached to the curcumin molecules. There are three positions where phosphorylation could occur in a curcumin molecule. Two possible sites are the phenol hydroxy groups on the rings of both ends of the unsaturated chain. The third possible site is the enol hydroxy group on the middle of the chain. The three positions in a curcumin molecule were all possible for esterification. However, it is likely the phosphate group attached to the phenolic groups because they would have less stereo-hindrance than the hydroxy group in the middle of the chain.

An attempt to solubilize the modified curcumin was conducted in water, (pH adjusted). It was determined that the solubility of the modified curcumin in water varied with pH. In a low pH medium (pH<1), the solubility was limited, however, its solution still had very good color. As pH increased, solubility increased. At pH > 6, the modified curcumin was highly soluble. At pH 3.5, which is a typical pH for pickle brines, the modified curcumin in amounts required for pigmentation was very water soluble, and thus, there were no problems in making solutions for pickle brines.

After heating at 86° C. for 1 hour, control samples of turmeric lost 2.2% of their initial absorbance while modified curcumin samples increased in absorbance by 7.3% as shown in Table 1 below. The reason for the increase in absorbance may be due to an increase in ionization and therefore solubilization of modified curcumin at elevated temperatures. After heating for 3 hours, the control lost 16.9% of its initial absorbance while modified curcumin lost only 4.6%

TABLE 1

Heat stability of modified curcumin

| Treatment | Fading (%) (Percent change at 420 nm) Hrs at 86° C. | |
|---|---|---|
| | 1 | 3 |
| Control (curcumin)[z] | −2.2a[x] | −16.9a |
| Modified curcumin[y] | +7.3b | −4.6b |

Conditions:
[z]Emulsified in pickle brine; 0.1 M acetic acid, 0.43 M NaCl and 0.02% Tween 80 at pH 3.5; initial absorbance was 0.71.
[y]Dissolved in pickle brine; 0.1 M acetic acid and 0.43 M NaCl at pH 3.5; initial absorbance was 0.69.
[x]Data followed by the same letter within columns are not significantly different (LSD 0.05).

Photodecomposition of unmodified curcumin is rapid with more than 70% color destruction occurring within 20 hours of exposure to light, see FIG. 1. FIG. I sets forth light induced fading of unmodified (control) and modified curcumin in pickle brine. The conditions were as follows: the reaction medium consisted of 0.1M acetic acid, 0.43M NaCl and turmeric oleoresin with initial absorbance at 420nm of 1.19, or modified curcumin with an initial absorbance of 1.06; light intensity 7,000 lux; 24° C. Modified curcumin lost 50% of its initial absorbance in about 60 hours. On the other hand, 50% of the absorbance of the unmodified curcumin was lost in only 9 hours. Therefore, the modified curcumin was approximately seven times more stable than the control.

The stability of modified curcumin and unmodified curcumin in pasteurized cucumber pickles under light conditions is set forth in Table 2.

TABLE 2

Stability of modified curcumin in pasteurized cucumber pickle spears maintained in light.

| Treatment | Color Difference Meter Values (Tristimulus) of Spear Surfaces[z] | | | |
|---|---|---|---|---|
| | L | a | b | b/a |
| Control | 44.8a | −4.7a | 11.1b | −2.4a |
| Modified Curcumin | 41.7b | −6.4b | 15.6a | −2.4a |
| Control + Spice Emulsion | 42.1b | −4.4a | 10.6b | −2.4a |
| Modified Curcumin + Spice Emulsion | 41.4b | −6.5b | 15.8a | −2.5a |

Conditions:
[z]Samples were stored in dark at 24° C. for 2 days and then exposed to light for 4 days.
[y]Data followed by the same letter within columns are not significantly different, LSD.05.

As set forth above, the CDM "L" values of modified curcumin samples were lower than that of the control samples. This indicates that the modified curcumin samples were darker than the control. There was no significant difference between modified curcumin and controls in other treatments. The negative CDM 'a' values of modified curcumin were greater than those of the controls in all cases. This indicates that the green color of modified curcumin is more stable than that of a control in the pasteurized cucumber pickle product.

Similarly, the CDM 'b' values of modified curcumin is much higher than that in control treatments, this was true regardless of whether spice emulsion is used or not. This indicates that the yellow color of the modified curcumin treatment is more stable and/or that it is absorbed into the tissue more readily than the unmodified curcumin. The ratio of b/a of all the treatments and controls did not show any significant difference, this indicates that there is no significant change in the color hue resulting from the modification of curcumin.

The effect of the spice emulsion did not cause a great difference among the treatments. The only significant difference was between CDM 'L' values of unmodified curcumin, with and without spice emulsion treatments.

The penetration into cucumber tissue of the modified curcumin was determined. The spears were cut into cross section pieces and examined by visual observation for pigment penetration. The yellow color of the modified curcumin had penetrated into the mesocarp tissue. The unmodified curcumin, however, was only absorbed on the outer surface of the mesocarp tissue with little or no penetration to the internal tissues which remained pale.

Figure 2:
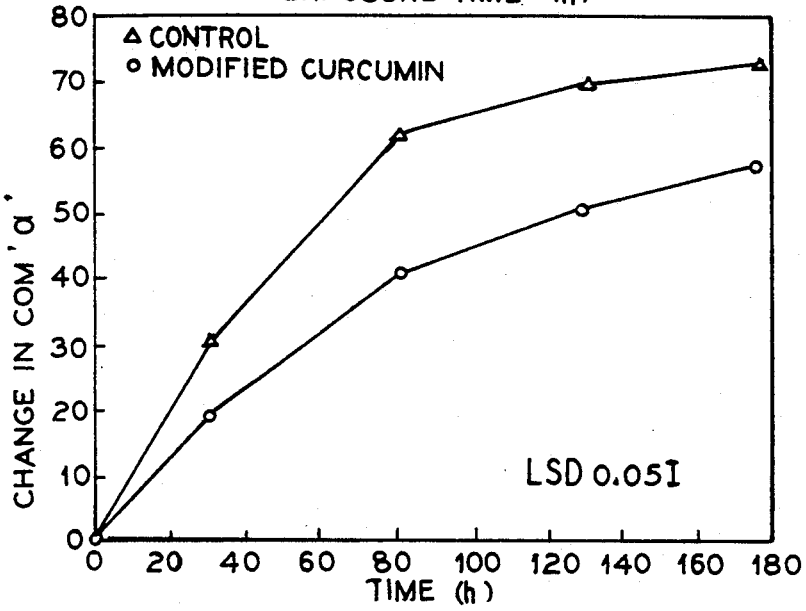
FIG. 2 illustrates, graphically, decrease in CDM "b" values (yellowness) of yogurt pigmented with modified and unmodified curcumin during storage under flourescent light.

With respect to stability in yogurt, the CDM 'L' value of the treatments was not significantly altered by the treatments. FIG. 2 illustrates the percent decrease in CDM 'b' values of yogurt pigmented with unmodified (control) and modified curcumin as affected by exposure to light. The conditions were as follows: initial CDM 'b' values were 33.4 and 31.0 for samples pigmented with unmodified and modified curcumin, respectively. Ten gram samples were uniformly distributed in 100×15mm petri dishes and exposed to light (14,250 lux); 8° C.

Figure 3:
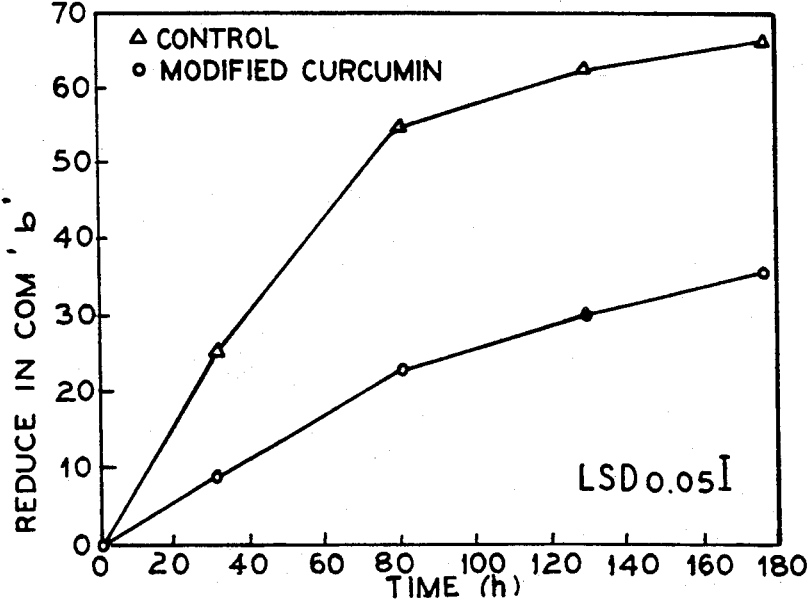
FIG. 3 illustrates, graphically, percent decline in CDM 'b' values (yellowness) of tablets pigmented with modified and unmodified curcumin during exposure to sunlight.

The CDM 'b' value (yellowness) of the modified curcumin declined during storage in light; however the rate of color deterioration of the modified pigment was much lower than the deterioration of the unmodified pigment. The CDM 'b' of the control declined by about 50% in 70 hours while only about 20% of the yellowness (CDM 'b') was destroyed in samples pigmented with modified turmeric during the same time period. changes in yellow color (CDM 'b' value) of tablets prepared with unmodified (control) and modified curcumin in response to exposure to sunlight are illustrated in FIG. 3. The conditions were as follows: tablets containing unmodified or modified curcumin were placed in mid-day sunlight. Initial CDM 'b' values were 37.8 and 36.3 for tablets pigmented with unmodified and modified curcumin, respectively.

The yellow color of tablets pigmented with unmodified curcumin declined very rapidly in sunlight. Within 5 minutes, the CDM 'b' value (yellowness) declined by about 50% in the control samples.

Sunlight, also, caused tablets pigmented with modified curcumin to fade; however, the destruction of the yellow color was substantially attenuated as compared to the fading of pigmentation in the control samples. While a 50% decline in CDM 'b' values of control samples occurred in 5 minutes, 35 minutes of exposure to sunlight was required for a 50% decline in CDM 'b' values of samples containing modified curcumin.

The experiments set forth above demonstrate the improvements achieved by the modified curcumin. The modified curcumin was about seven times more stable in light than was unmodified curcumin in pickle brine. In a pasteurized pickle product it was more stable than was the control. The modified curcumin was more stable than unmodified curcumin in yogurt. In tablets exposed to sunlight, modified curcumin was about seven times more stable than was unmodifed curcumin.

Curcumin was phosphorylated by phosphorus oxychloride ($POCl_3$) at 0° C. in alkaline medium. Of course, it should be appreciated that other compounds can be used to phosphorylate the turmeric. It was found that one mole of the modified curcumin contained an average of about one mole of phosphorus. The modified curcumin was water soluble. Because of its water solubility, it was able to penetrate mesocarp tissue of cucumber pickles.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A method for modifying a turmeric for use as a dye, comprising the step of:
   phosphorylating a turmeric.
2. The method of claim 1, wherein the turmeric is phosphorylated with $POCl_3$.
3. The method of claim 1, wherein the turmeric is phosphorylated while being maintained at a predetermined pH range.
4. The method claims 3, wherein the pH range is approximately 12 to about 13.
5. The method of claim 1, wherein the resultant product includes one mole of turmeric and one mole of phosphorus.
6. The dye of the process of claim 1.
7. A method for modifying a turmeric for use as a dye, comprising the steps of:
   dissolving a turmeric in an aqueous alkali solution to produce a mixture;
   maintaining the mixture at a predetermined pH range; and
   adding a phosphorylating agent to the mixture to create a modified turmeric.
8. The method of claim 7, wherein the pH range is approximately 12 to about 13.
9. The method of claim 7, wherein the phosphorylating agent is $POCl_3$.
10. The method of claim 7, wherein the turmeric is a curcumin.
11. The method of claim 7, wherein the aqueous alkali solution is sodium hydroxide.
12. A method for modifying a turmeric for use as a dye, comprising the steps of:
    a) dissolving a turmeric in an aqueous alkali solution;
    b) cooling a resultant mixture while maintaining the mixture at a predetermined pH; and
    c) adding a phosphorylating agent to the mixture to create a phosphorylated turmeric.
13. The method of claim 12, including the step of flushing the resultant mixture of step b) with nitrogen.
14. The method of claim 12, wherein the phosphorylating agent is $POCl_3$.
15. The method of claim 12, including the step of neutralizing a resultant product of step c).
16. The method of claim 12, including the step of drying a product of step c).
17. The method of claim 12, including the step of purifying a product of step c).
18. A dye comprising: a phosphorylated turmeric, said turmeric comprising curcumin and curcuminoids.
19. The dye of claim 18, wherein the turmeric is phosphorylated with $POCl_3$.
20. A dyed product including a yellow dye wherein the yellow dye is a phosphorylated tumeric and wherein said product is selected from the group consisting of a cosmetic, a pharmaceutical, and a foodstuff.

* * * * *